Dec. 20, 1955  W. R. WESTFALL  2,727,554
MENDING PLUG FOR TUBELESS TIRES
Filed April 29, 1955
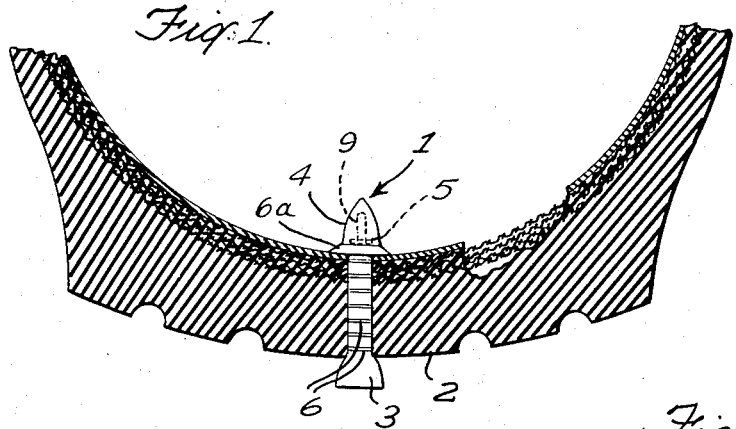
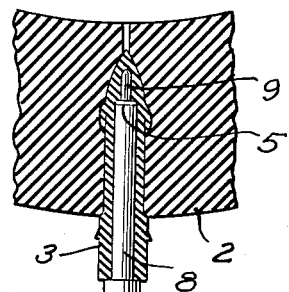
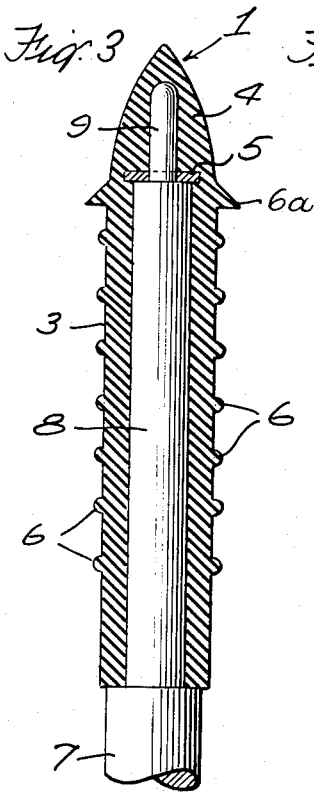
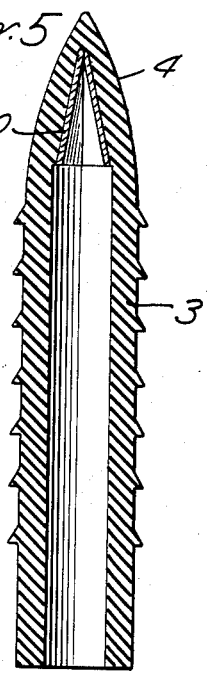
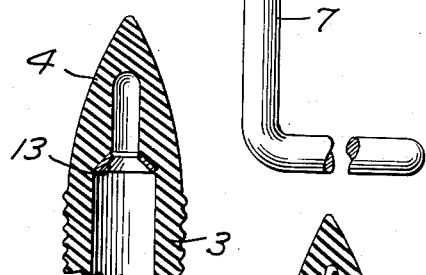
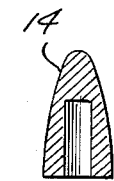
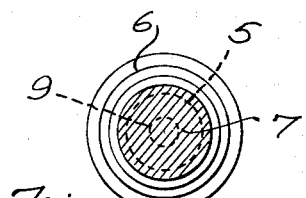
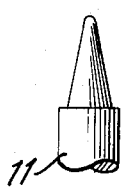
INVENTOR
WILLIAM R. WESTFALL
BY
ATTORNEY

United States Patent Office 2,727,554
Patented Dec. 20, 1955

2,727,554

MENDING PLUG FOR TUBELESS TIRES

William R. Westfall, Forest Hills, N. Y., assignor to Salescaster, Inc., Forest Hills, N. Y., a corporation of New York Application April 29, 1955, Serial No. 504,970

5 Claims. (Cl. 152—370)

This invention relates to means for mending punctures in pneumatic tires and particularly to means for plugging leak orifices in tubeless tires.

Since the tubeless tires themselves provide the airtight casing, they must be kept hermetically closed to prevent deflation and the mending of holes through the treads of such tires presents a problem substantially different from that of patching an inner tube.

For practical reasons it is desirable to have repair means for the purpose which are effective and are at the same time easily employed without the need for special skill. Minute perforations which may cause slow leaks may be stopped by the insertion of a well known latex compound which will set and close the perforation. But larger punctures through the tire tread, such as are caused by nails or the like, usually require the insertion of a plug to close the perforation.

It is customary to employ for this purpose a hollow rubber cylindrical plug which is pointed and closed at one end and which is inserted into the puncture by means of a tool which is in the nature of a small rod that is entered into the axial bore of the plug and presses the pointed end into the opening and through the tread until the pointed end protrudes into the air cavity. The tool is then withdrawn and the resiliency of the tire tightly compresses the plug and forms an airtight seal. Usually a latex compound is applied in the hole and about the plug to create an effective adhesion of the plug to the wall of the opening and also to seal any small irregularities in the wall of the puncture. The plug is substantially the same resiliency, hardness and consistency as the tread and the protruding end of the plug readily wears down to the surrounding face of the tread and the amalgamation is complete and the repair plug becomes virtually invisible.

However the pressure of the end of the tool during the insertion of the plug is axially on the inside of the point with the result that frequently the point is ruptured and the plug becomes a tubular conduit for leakage of air. When this occurs it is difficult and oftentimes impossible to extract the ruptured plug and the tire has to be taken to a shop equipped for the purpose for repair.

To minimize the likelihood of this it has been the practice to terminate the tool receiving bore in the plugs a substantial distance from the point. This leaves an unsupported pointed end which is easily deflected during the insertion and sometimes bends so as to make further insertion impossible.

The tires have a plurality of plies of reinforcing fabric molded within their body so as to leave a rubber inner liner and a puncture is apt to rupture the fabric and leave the ends of the broken yarn or cord protruding into the hole resulting from the puncture. The insertion of the mending plug tends to carry these broken ends inwardly and if they are of sufficient length they will protrude into the hollow interior of the tube. In such case air is apt to follow the cords by capillarity and slow leakage is apt to result. The plugs of known construction have had no means for preventing this.

The principal object of the present invention is to eliminate these defects in such plugs. More specifically it is an object to relieve the point from pressure during the insertion and at the same time to reinforce the point so as to keep it axially alined with the body or shank of the plug. Another object is to provide effective means for preventing the escape of air by capillarity. Other objects and advantages of the invention will appear as the description proceeds.

The invention contemplates the provision of a reinforced internal shoulder at the beginning of the tapered or pointed end which will receive the pressure of the tool and which will allow the end of the tool to extend into the point and keep it in alinement. In this way the bore can extend well down into the point without any danger of rupture.

For example, in a form of the invention which has proven commercially satisfactory, the bore in the pointed end is of less diameter than that in the cylindrical body or shank of the plug, thereby forming a shoulder which may be abruptly transverse to the axis or which may be tapered and conical. An annulus in the form of a flat or conical washer is disposed on the shoulder during the molding operation and the tool is correspondingly shouldered so that the washer receives the pressure of the shoulder on the tool. The extreme end of the tool is reduced in diameter so as to extend through the washer to the bottom of the bore in the pointed end. This bore may be extended to within wall thicknes of the external pointed end.

While metal is at present preferred for the washers, it will be understood that other sufficiently strong materials, such as certain plastics, may be employed.

It is within the contemplation of the invention to provide a pressure receiving annulus by means other than a transverse washer disposed on a shoulder at the meeting of the bores in the body or shank and pointed end. For example, it is contemplated that an insert of metal or the like may be fitted into the pointed end the rear end of which will provide a pressure receiving shoulder and which will constitute a reinforcing liner for the point.

The invention also contemplates means for sealing the space about the plug where it emerges through the interior liner of the tire, against the escape of air by capillarity. For this purpose the invention comprises an integral collar or sealing ring on the plug at or near the base of the pointed end which overlaps the inner wall of the tire around the joint and is brought into contiguous sealing relation therewith by the withdrawal of the inserting tool, the latex compound about the joint effecting an hermetic union between the inner face of the liner and the contiguous face of the collar.

The embodiments of the invention illustrated in the accompanying drawings will now be described, after which the invention will be pointed out in claims.

Fig. 1 is a section of the tread portion of a tubeless tire with a puncture closing plug embodying the invention disposed therein;

Fig. 2 is an enlarged fragmentary section through a tire tread and a mending plug with the inserting tool therein and shown at an incomplete stage of insertion of the plug;

Fig. 3 is an enlarged axial section of one form in which the invention may be embodied and showing the inserting tool in place;

Fig. 4 is an end view of the same;

Fig. 5 is a section similar to Fig. 3 of a modified form of the invention;

Fig. 6 is a detail of the end of a tool for inserting the plug shown in Fig. 5;

Fig. 7 is a section of the end of a plug showing another modified form of the invention;

Fig. 8 is a detail of the end of a tool for inserting the plug shown in Fig. 7;

Fig. 9 is a plan of a modified form of pressure receiving annulus of Fig. 7;

Fig. 10 is a sectional detail of a modified form of pressure receiving annulus and reinforcing liner for the pointed end of the plug; and Fig. 11 is a sectional detail of another modification of the type shown in Fig. 5.

The plug 1 which is shown in the tread section 2 of a tubeless tire in Fig. 1 is the same as that shown in Figs. 2 and 3 and will now be described. It is understood that the plugs are ordinarily formed by molding in a sectional mold which in the form of Fig. 3 will part at the juncture of the cylindrical and conical portions of the plug. A cylindrical core equivalent to the inserted portion of the tool shown in Fig. 3 produces the bore in the molded plug and the washer set on the shoulder of the core is somewhat larger than the bore in the plug body and hence is molded into the wall of the bore.

The plug 1 has an axially hollow cylindrical body or shank portion 3 and a closed pointed top end 4 which has an axial bore of reduced diameter forming a shoulder on which the flat metal washer 5 is seated. The bore in the pointed end extends close to the external point, the rubber at the tip end being no more than average wall thickness. Along the external surface of the cylindrical body 3 are spaced circumferential ribs 6 such as are customarily used on plugs to enhance the sealing action of the plug.

As shown in this embodiment, the plug has a circumferential collar or sealing ring 6a formed substantially at the base of the pointed end 4 and having its outer or under surface in a plane normal to the axis of the plug, the top surface being tapered so that the collar is substantially frusto-conical in shape. This collar is for the purpose of effecting a seal about the inner end of the hole as above mentioned and as will presently be further described.

The inserting tool 7 has a rod portion 8 which terminates in a reduced end 9 of a size to pass through the hole in the washer 5 and fit in the bore in the pointed end and of a length to reach substantially to the bottom of the bore in the pointed end when the shoulder formed by the reduced end bears against the washer 5. The section 8 is shown as of the same length as the body 3 but this is incidental, the requirement being that the shoulder engage the washer without the handle compressing the plug.

It will be clear that the tool will hold the plug rigid during the insertion and that the pressure will be applied on the washer, thereby eliminating the danger of forcing on the tool through the pointed end. The tool will hold the plug distended until it is withdrawn, when the resilience of the tire will compress the hollow plug throughout that portion contained within the tire body. The protruding ends will remain expanded as shown in Fig. 1, and the outer end, as stated, will soon be worn off.

The ring 6a will be folded down during the insertion of the plug, as shown in Fig. 2, and will expand to its normal shape as it emerges into the air cavity of the tire.

The friction of the portion 8 of the tool 7 on the inner wall of the plug as the tool is withdrawn will draw the plug out so as to cause the bottom face of the ring 6a to bear tightly against the inner face of the rubber liner of the tire. The compound which is inserted in the puncture has a latex base and it will coat the two contiguous faces and effect sealing union therebetween, as shown in Fig. 1.

Fig. 5 shows a different form of pressure receiving and point reinforcing member. Instead of the flat washer 5, a conical metallic liner 10 is molded into the pointed end. The metallic liner may be open ended as shown in Fig. 11. This type of plug calls for a tool 11 which is shouldered to bear against the annular end of the liner 10 and is pointed beyond the shoulder to fit into the conical liner. Incidentally this plug does not have a sealing ring 6a and a different form of circumferential rib is shown in this construction, namely, one that is frusto-conical so as to function more in the nature of barbs and oppose withdrawal of the plug.

The plug of which the end portion is shown in Fig. 7 is like that shown in Fig. 2 except for the omission of a sealing ring and differs from the form shown in Fig. 3 in that the shoulder is conical and hence calls for a tool 12 such as shown in Fig. 8. The washer 13 has its edge scalloped, thereby forming radial extensions 13a as shown in Fig. 9, to facilitate the shaping operation. In this case the ribs are shown as closely spaced circumferential serrations.

Instead of stamped pressure receiving members as shown in Figs. 3, 5 and 7, the member may be a cast liner such as the member 14 shown in Fig. 10.

To avoid the necessity of exact conformance of the end of the tool 11 to the conical liner 10, the tip end of the liner may be removed, as shown in Fig. 11. Thus there will be assured the engagement of the shoulder of the tool against the annular base of the liner and of the conical end of the tool within the liner during the inserting operation.

It is obvious that still other modifications may be made in the constructions shown in the drawings and above particularly described within the principle and scope of the invention as defined in the following claims.

What is claimed is:

1. A puncture closing plug for tubeless tires comprising an elongated cylindrical pliable rubber shank of substantially uniform diameter throughout its length and having a pointed extension on one end of the shank and having the other end blunt, the shank having an axial bore of uniform diameter extending throughout its length and open at the blunt end, and the pointed extension having an axial bore of smaller diameter than that of the shank and closed at its outer end and forming a coaxial continuation of the bore of the shank, thereby forming an annular shoulder at the juncture of the two bores constituting an abutment for the shoulder of a stepped inserting tool entered into the bore of the shank, and the bore of smaller diameter in the extension being adapted to receive and fit the reduced end of the tool.

2. A puncture closing plug for tubeless tires comprising an elongated cylindrical pliable rubber shank of substantially uniform diameter throughout its length and having a pointed extension on one end of the shank and having the other end blunt, the shank having an axial bore of uniform diameter extending throughout its length and open at the blunt end, and the pointed extension having an axial bore of smaller diameter than that of the shank and closed at its outer end and forming a coaxial continuation of the bore of the shank, thereby forming an annular shoulder at the juncture of the two bores, and a pressure receiving annulus of relatively stiff material disposed upon said shoulder coaxially with the bores in position to form an abutment for the shoulder of a stepped inserting tool entered into the bore of the shank and extending through the annulus into the pointed extension and fitting in the bore of smaller diameter.

3. A puncture closing plug for tubeless tires as defined in claim 1 together with an external integral sealing ring on the plug at the base of the pointed extension.

4. A puncture closing plug for tubeless tires as defined in claim 2 together with an external integral sealing ring on the plug at the base of the pointed extension.

5. A puncture closing plug for tubeless tires as defined in claim 2 in which the pressure receiving annulus is a flat metal washer of a larger diameter than that of the bore of the shank and has its peripheral margin embedded in the wall of said bore.

References Cited in the file of this patent

UNITED STATES PATENTS

| 581,641 | Wolf | Apr. 27, 1897 |
| 594,066 | Cluxton | Nov. 23, 1897 |
| 598,650 | Tucker | Feb. 8, 1898 |
| 2,095,931 | Kraft | Oct. 12, 1937 |